United States Patent
Shi et al.

(10) Patent No.: US 11,663,536 B2
(45) Date of Patent: May 30, 2023

(54) GENERATING A MACHINE-LEARNED MODEL FOR SCORING SKILLS BASED ON FEEDBACK FROM JOB POSTERS

(71) Applicant: Microsoft Technology Licensing, LLC, Redmond, WA (US)

(72) Inventors: Baoxu Shi, San Jose, CA (US); Feng Guo, Los Gatos, CA (US); Jaewon Yang, Campbell, CA (US); Qi He, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 714 days.

(21) Appl. No.: 16/443,608

(22) Filed: Jun. 17, 2019

(65) Prior Publication Data
US 2020/0394592 A1    Dec. 17, 2020

(51) Int. Cl.
*G06Q 10/06* (2023.01)
*G06Q 10/10* (2023.01)
*G06N 20/00* (2019.01)
*G06Q 10/0631* (2023.01)
*G06Q 10/1053* (2023.01)
*G06Q 10/0639* (2023.01)

(52) U.S. Cl.
CPC ..... *G06Q 10/063112* (2013.01); *G06N 20/00* (2019.01); *G06Q 10/06393* (2013.01); *G06Q 10/06398* (2013.01); *G06Q 10/1053* (2013.01)

(58) Field of Classification Search
CPC ..... G06Q 10/063112; G06Q 10/06393; G06Q 10/06398; G06Q 10/1053; G06N 20/00
See application file for complete search history.

(56) References Cited

U.S. PATENT DOCUMENTS

| | | | |
|---|---|---|---|
| 2017/0255906 A1* | 9/2017 | Le | G06F 16/9535 |
| 2018/0121880 A1* | 5/2018 | Zhang | G06Q 50/01 |
| 2018/0181544 A1* | 6/2018 | Zhang | G06N 3/044 |
| 2018/0314756 A1* | 11/2018 | Wang | G06F 16/328 |
| 2018/0315019 A1* | 11/2018 | Kenthapadi | G06F 16/9535 |

OTHER PUBLICATIONS

Xu et al., "Measuring the Popularity of Job Skills in Recruitment Market: A Multi-criteria Approach." The Thirty-Second AAAI Conference on Artificial Intelligence (AAAI-18), Feb. 2018, pp. 2572-2579. https://dl.acm.org/doi/pdf/10.5555/3504035.3504349 (Year: 2018).*

* cited by examiner

*Primary Examiner* — Eric W Stamber
*Assistant Examiner* — Alissa D Karmis
(74) *Attorney, Agent, or Firm* — Schwegman, Lundberg & Woessner, P.A.

(57) ABSTRACT

Techniques for scoring data items using a machine-learned model are provided. In one technique, multiple skills are identifying based on a job posting. Multiple attribute values of the job posting are identified. For each identified skill, multiple probabilities are identified, each probability corresponding to a different attribute value of the identified attribute values. The probabilities are input into a machine-learned model to generate multiple scores. Multiple skills of a candidate user are identified. An affinity score between the job posting and the candidate user is generated based the scores and the skills of the candidate user.

18 Claims, 5 Drawing Sheets

Basic Qualifications:

- BA/BS Degree in Computer Science or Machine Learning or related technical discipline, or related practical experience.

310

Add skill keywords to make your job more visible to the right candidates (Select up to 10)

✓ Java
✓ Data Mining
✓ Machine Learning
✓ Data Science
✓ Natural Language Processing (NLP)
✓ Natural Language
✓ Ad Targeting
✓ Statistics + Deep|

Deep Learning

GENERATING A MACHINE-LEARNED MODEL FOR SCORING SKILLS BASED ON FEEDBACK FROM JOB POSTERS

TECHNICAL FIELD

The present disclosure relates to machine learning and, more particularly to, using machine learning techniques to train a model for scoring skills based on feedback from job posters.

BACKGROUND

The Internet has enabled the growth of online talent platforms that match job openings to job seekers both globally and locally. To serve recruiters well and recommend the appropriate job openings to job seekers, it is important to develop targeting systems that show job postings to quality candidates who are both qualified and willing to apply for the respective job openings. By targeting the best candidates, recruiters can save on expending valuable resources, reduce their interview workload, and increase application conversion rate.

However, targeting the right job openings to the right candidates is a challenging task, particularly for large talent platforms that manage data about millions of users and millions of job openings. Indeed, it is computationally intractable to define a target candidate set by specifying individual members. For this reason, many job posting models target candidates by profile attributes, such as job titles, skills, and companies. Among these types of attributes, skills are one of the most important for job targeting. Compared to other entities such as titles and companies, skills are more time-invariant and can model the candidates with finer granularity. In general, there are two ways to perform skill-based targeting. One way is targeting by coarse skill categories, which is easier to implement but may not be granular enough for jobs requiring interdisciplinary skills.

Another way is targeting by individual skill entities. However, due to the high cardinality of skills, such an approach usually requires large scale data to train a strong machine-learned model. One approach is to identify the skills that are mentioned in job postings and match those skills to a user's profile. Such an approach does not differentiate the importance of skills given conditions pertaining to current job postings or current user profiles.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a screenshot of an example job posting generation interface, in an embodiment;

DETAILED DESCRIPTION

Figure 1:
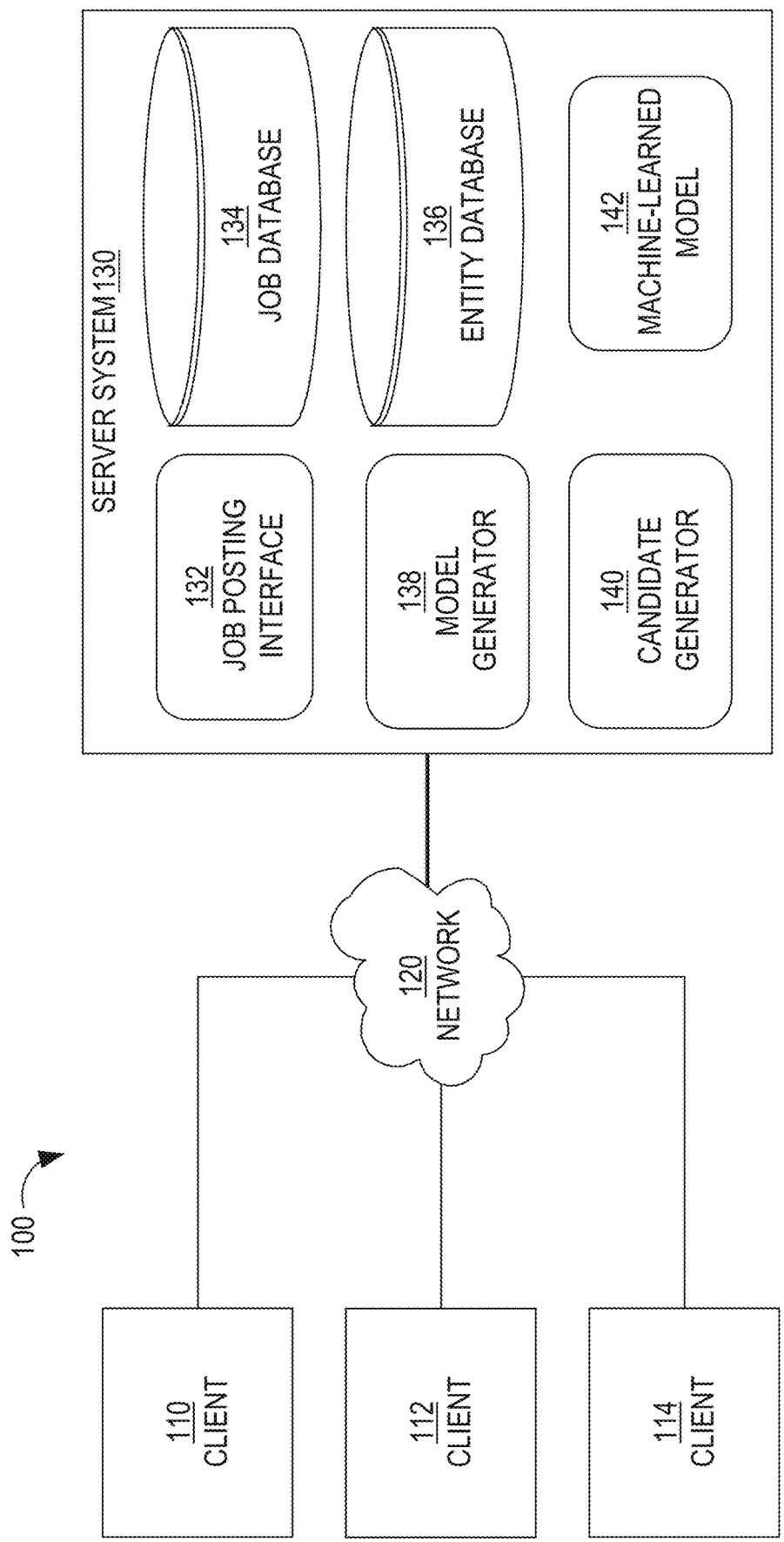
FIG. 1 is a block diagram that depicts an example system for scoring skills using a machine-learned model, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for using a machine-learned model to score skills extracted from a job posting and leveraging the scores in one or more ways. In one technique, scores of skills may be used to select which candidate skills of a job posting to present to a poster of the job posting. In a related technique, feedback from the poster regarding which candidate skills are selected, which candidate skills are removed or rejected, and which skills are added explicitly by the poster is used to retrain the machine-learned model or to train a new machine-learned model.

In one technique for designing the machine-learned model, the machine-learned model is based on posting features, member features, and poster preference features, such as percentage of job postings associated with a particular job title having a particular skill, percentage of users associated with a particular job function having a particular skill, and/or percentage of posters who have specified a particular industry selecting or rejecting a particular skill.

In another technique, given a job posting that includes a list of skills, the machine-learned model is used to generate a score for each skill in the list. The scores of those skills and matching skills in a candidate user's profile are used to generate an affinity score between the job posting and the candidate user. The affinity score is used to determine whether the job posting is to be presented as a recommendation or notification to the candidate user. Additionally or alternatively, the affinity score is used to determine whether to present data about the candidate user to a recruiter that is associated with (e.g., responsible for, author of) of the job posting.

Embodiments improve computer-related technology related to skill suggestion and scoring for candidate user-candidate posting pairs. Present approaches for scoring candidate user-candidate posting pairs do not consider the importance of skills given the current job market's supply and demand. Instead, all skills in a job posting are treated equally even though different skills have different levels of importance within certain industries or fields. By building a machine-learned model that takes into account the importance of skills within industries or fields, skill suggestion, job posting recommendations, and candidate recommendations are more relevant and targeted, resulting in greater user engagement and perceived utility of the skill-based system. For example, using the machine-learned model increases the quality of recommended skills to job posters, which quality reduces (a) the number of skills manually added by job posters and (b) the number of recommended skills rejected by job posters. As another example, using the machine-learned model results in a greater number of confirmed hires from job applicants.

System Overview

FIG. 1 is a block diagram that depicts an example system 100 for scoring skills using a machine-learned model, in an embodiment. System 100 includes clients 110-114, network 120, and server system 130.

Each of clients 110-114 is an application or computing device that is configured to communicate with server system 130 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 and that executes within a web browser running on a computing device. Each of clients 110-114 may be implemented in hardware, software, or a combination of hardware and software. Although only three clients 110-114 are depicted, system 100 may include many more clients that interact with server system 130 over network 120.

Network 120 may be implemented on any medium or mechanism that provides for the exchange of data between clients 110-114 and server system 130. Examples of network 120 include, without limitation, a network such as a Local Area Network (LAN), Wide Area Network (WAN), Ethernet or the Internet, or one or more terrestrial, satellite or wireless links.

Server system 130 includes a job posting interface 132, a job database 134, an entity database 136, a model generator 138, a candidate generator 140, and a machine-learned model 142. Although depicted as a single element, server system 130 may comprise multiple computing elements and devices, connected in a local network or distributed regionally or globally across many networks, such as the Internet. Thus, server system 130 may comprise multiple computing elements other than the depicted elements. Additionally, although only a single machine-learned model 142 is depicted, server system 130 may include multiple machine-learned models that generate scores for skills.

Machine Learning

Machine-learned model 142 is automatically trained using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users. The statistical model is trained based on multiple attributes. In machine learning parlance, such attributes are referred to as "features." To generate and train a statistical prediction model, a set of features is specified and a set of training data is identified.

Embodiments are not limited to any particular machine learning technique for training a model. Example machine learning techniques include linear regression, logistic regression, neural networks, random forests, naive Bayes, Support Vector Machines (SVMs), and XGBoost, which is relatively fast, interpretable, and scalable. Advantages that machine-learned models have over handcrafted rule-based models include the ability of machine-learned models to output a probability (as opposed to a number that might not be translatable to a probability), the ability of machine-learned models to capture non-linear correlations between features, and the reduction in bias in determining weights for different features.

Machine-Learned Skill Scoring Model

Machine-learned model 142 is a skill scoring model that generates a score on a per skill basis. A score produced by machine-learned model 142 represents an importance of the corresponding skill to potential job applicants, to recruiters, and/or to job posters. The higher the score of a skill, the more likely that the skill will be relevant to a job poster, a recruiter, and/or a job seeker.

Examples of types of features upon which machine-learned model 142 is based include job-side features, user-side features, poster preference features, and job content features. User-side features are a measure of user-side skill supply. Including user-side features in machine-learned model 142 helps improve exposure of a job position to relatively many prospective users/job applicants. Job-side features measure a skill's demand in the job market. Including job-side features in machine-learned model 142 helps better target applicants who are available. Job content features helps ensure that inferred skills target qualified applicants who have the required skills.

Examples of job-side features include a probability of a finding a certain skill in job postings given the job title specified in a corresponding job posting (e.g., P(skill|job title)), a probability of a finding a certain skill in job postings given the job industry specified in the corresponding job posting (e.g., P(skill|job industry)), a probability of a finding a certain skill in job postings given a job function specified in a corresponding job posting (e.g., P(skill|job function)), a probability of a finding a certain skill in job postings given a job function and a job title specified in the corresponding job posting (e.g., P(skill|job function && job title)), etc. Thus, the set of job postings that are considered for computing a probability may be limited to job postings that satisfy multiple criteria. The job postings that are analyzed to compute these probabilities may be found in job database 134.

In order to calculate, for example, P(skill|job title), a first number of job postings that have the job title is counted, a second number of those job postings that have the skill listed is counted, and a ratio of the second number to the first number is computed, where the ratio indicates P(skill|job title).

Examples of user-side features are similar to job-side features and include a probability of finding a certain skill in user profiles given a job title specified in a corresponding job posting, a probability of finding a certain skill in user profiles given a job industry specified the corresponding job posting, a probability of finding a certain skill in user profiles given a job function specified in the corresponding job posting, a probability of finding a certain skill in user profiles given a job function and a job title specified in the corresponding job posting, etc. For example, in order to calculate P(skill|job title), a first number of user profiles that have the job title is counted, a second number of those user profiles that have the skill listed therein is counted, and a ratio of the second number to the first number is computed, where the ratio indicates P(skill|job title). The user profiles that are analyzed to compute these probabilities may be found in entity database 136.

In order to calculate, for example, P(skill|job title), a first number of user profiles that list the job title is counted, a second number of those user profiles that list the skill is counted, and a ratio of the second number to the first number is computed, where the ratio indicates P(skill|job title).

An example of a poster preference feature is a ratio of (1) a number of job postings to which job posters have added a certain skill (i.e., $A_k$) to (2) a number of job postings that contain the certain skill (i.e., $S_k$). AddRate$_k$=$A_k$/$S_k$. (Some skills are automatically recommended by server system 130; such skills are not part of the value of (1), but may be part of the value of (2).) This ratio is referred to herein as a "poster add rate." When a list of recommended skills is presented to a job poster, the job poster may modify the list by accepting a recommended skill without any action, removing a recommended skill, and adding a new skill, to form a set of "selected" skills for a job posting. In some embodiments, the number of selected skills for a single job posting is limited to a certain number, such as no more than ten. The poster add rate is one of two features that may be built for each skill.

A higher feature value of the poster add rate implies that the skill should be more likely to be recommended. When the value of (2) is not large, the poster add rate value is very sensitive to the data change. Some skills appear in a relatively small number (e.g., five) of job postings. In an embodiment, for skills that appear in fewer than N job postings (whether only currently-active job postings, job postings for all time, or job postings that were active during a limited period of time), the poster add rate feature is not used. Instead, a default feature value for the poster add rate feature may be used. Alternatively, a poster add rate value for a skill k that does not appear in many job postings may be calculated by computing a skill-specific poster add rate (i.e., AddRate$_k$ for skill k) and then subtracting an overall poster add rate (i.e., AddRate) (that is based on multiple (e.g., all) skills) from the skill-specific poster add rate (i.e., AddRate$_k$).

In an embodiment, a weight is added to the poster add rate value to make the feature value smooth. Again, AddRate$_k$ refers to the poster add rate for skill k, and AddRate refers to the overall poster add rate for multiple (e.g., all) skills. Adding the weight may be implemented as follows:

$$\text{AddRate}_k = (A_k - S_k * \text{AddRate})/(S_k + w)$$

The other feature (referenced above) that may be built for each skill based on feedback from job posters (and that is another example of a poster preference feature) is referred to as a "poster remove rate." The poster remove rate is a ratio of (1) a number of job postings in which job posters have removed an automatically recommended skill (i.e., $R_k$) to (2) a number of job postings that contain the skill based on an automatic recommendation (i.e., $P_k$). RemoveRate$_k$=$R_k$/$P_k$. A higher feature value of this poster remove rate implies that the skill should not be recommended. When the value of (2) is not large, the poster remove rate value is very sensitive to the data change. Some recommended skills appear in a relatively small number (e.g., five) of job postings. In an embodiment, for recommended skills that appear in fewer than N job postings (whether only currently-active job postings, job postings for all time, or job postings that were active during a limited period of time), the poster remove rate feature is not used. Instead, a default feature value for the poster remove rate feature may be used. Alternatively, a poster remove rate value for a skill that does not appear in many job postings may be calculated by computing a skill-specific poster remove rate (i.e., for the skill) and then subtracting a total poster remove rate (that is based on multiple (e.g., all) skills) from the skill-specific poster remove rate.

In an embodiment, a weight is added to the poster remove rate value to make the feature value smooth. Again, RemoveRate$_k$ refers to the poster remove rate for skill k, and RemoveRate refers to the overall poster remove rate for multiple (e.g., all) skills. Adding the weight may be implemented as follows:

$$\text{RemoveRate}_k = (R_k - P_k * \text{RemoveRate})/(P_k + w)$$

Other examples of poster preference features are similar to job-side and user-side features and include a probability of a job poster selecting a certain skill given a job title specified in a corresponding job posting, a probability of a job poster selecting a certain skill given a job industry specified the corresponding job posting, a probability of a job poster selecting a certain skill given a job function specified in the corresponding job posting, a probability of a job poster selecting a certain skill given a job function and a job title specified in the corresponding job posting, etc. For example, in order to calculate P(skill|job title) for a particular skill and a particular job title, a first number of job posters who have specified the particular job title in a job posting is counted, a second number of those job posters who have selected the particular skill (whether the job poster specified the particular skill or the particular skill was automatically selected and the job poster confirmed the selection) is counted, and a ratio of the second number to the first number is computed, where the ratio indicates P(skill|job title). The job posting history that is analyzed to compute these probabilities may be found in job database 134 or another database (not depicted) that tracks job poster interactions through job posting interface 132.

In an embodiment, machine-learned model 142 is based on a strict subset of job-side features, user-side features, poster preference features, and job content features. For example, machine-learned model may be based only on job-side features or only on user-side features.

Job Titles, Functions, and Industries

A job title is the name of a position within an organization filled by an employee. A job function is the name of a routine set of tasks or activities undertaken by a person with that job function. A person's title and function are often closely related, though not all job functions are clear based on job title alone. Examples of job functions include Legal, Sales, Marketing, Operations Management, Human Resources, Information Technology, Finance, Engineering, Healthcare Services, and Accounting. Examples of job industries include Information Technology and Services, Marketing and Advertising, Human Resources, Computer Software, Financial Services, Staffing and Recruiting, Internet, Management Consulting, Telecommunications, and Retail.

Poster Feedback Process

Figure 2:
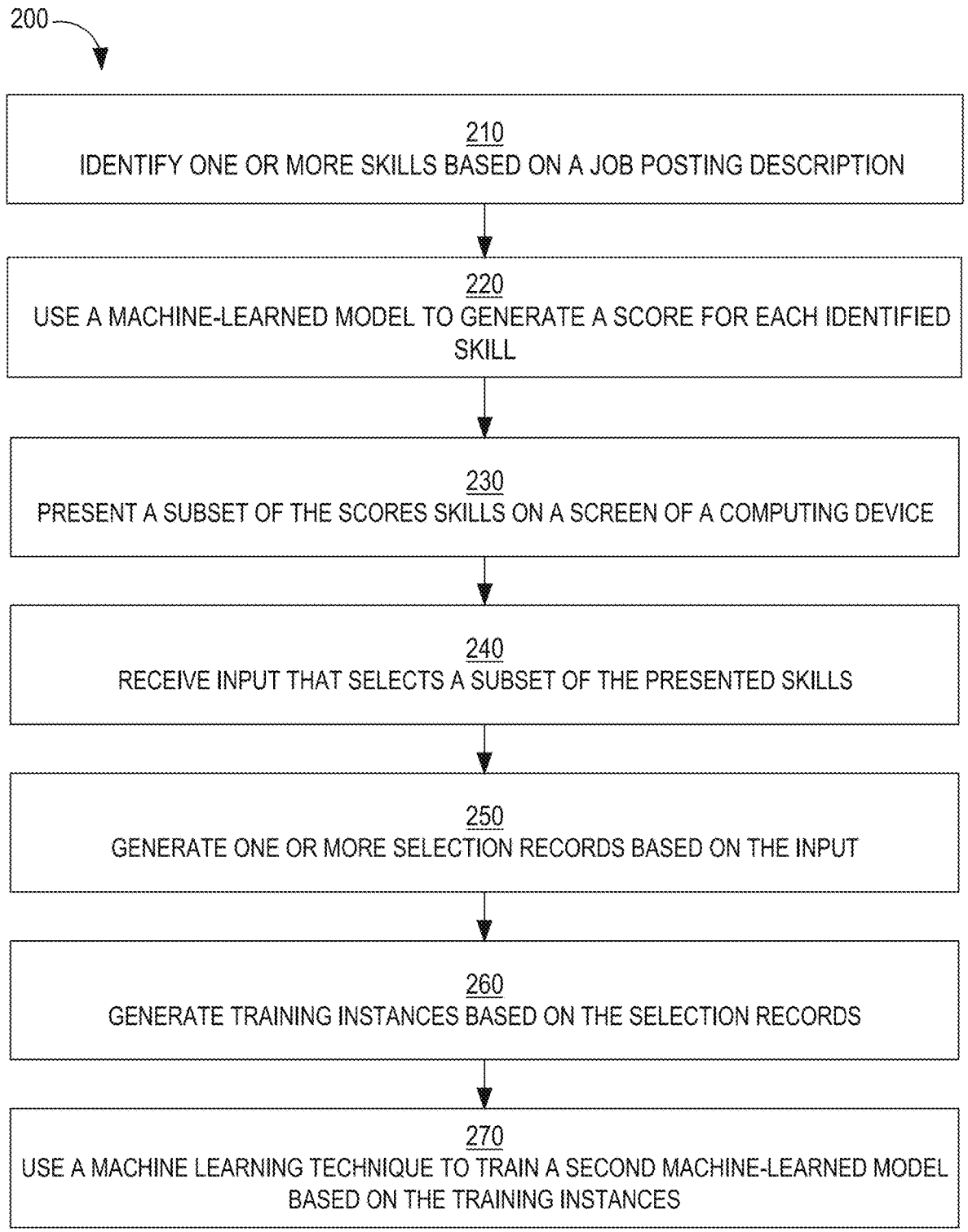
FIG. 2 is a flow diagram that depicts an example process for leveraging machine-learned model 142 in generating scores for skills extracted from a job posting, in an embodiment.

FIG. 2 is a flow diagram that depicts an example process 200 for leveraging machine-learned model 142 in generating scores for skills extracted from a job posting, in an embodiment.

At block 210, a job posting description is analyzed to identify one or more skills. For example, a job poster (a user), utilizing client 112, submits a text description of a job opening through job posting interface 132. Job posting interface 132 may be presented by a web application executing within a web browser on client 112 or by a native application executing on client 112. Job posting interface 132 may include text fields for different types of information, such as a text field for a name of the job opening, a text field for one or more job titles, a text field (or drop down menu) for a job function, a text field (or drop down menu) for job industry, and a text field for a description of the job.

Job posting interface 132 may also include a skills section for presenting skills. The skills that are presented in the skills section may be automatically presented based on information derived from the other text fields. The skills that are automatically presented may be limited to a standardized set of skills. Additionally or alternatively, job posting interface 132 allows a job poster to specify skills. Thus, the skills section may include skills that server system 130 automatically identifies and includes that the job poster specifies.

In an embodiment, job posting interface 132 may allow a job poster to enter text and, in response, job poster interface 132 displays one or more candidate skills that are text completions of what the job poster has entered thus far. For example, if the job poster enters "comp," then candidate skills that are determined based on that text include "computer science," "computer engineering," "computer software development," and/or "software developer" even though it is not a textual completion of "comp" but rather may be a common string that is selected when job posters enter "comp." Again, the candidate skills may be limited to a standardized set of skills.

Block 210 may involve extracting skills from a text description of the job position. The extracted text may be compared to a standardized set of skills. If there is a perfect match (character for character) between an extracted skill and a standardized skill, then the extracted skill is selected. If there is not an exact match between an extracted skill and any standardized skill, but the extracted skill is relatively close to a standardized skill, then the standardized skill may still be identified as a match.

At block 220, machine-learned model 142 generates a score for each of the one or more skills identified in block 210. Block 220 may involve computing, for each skill, a feature value for each feature of machine-learned model 142. Thus, if there are ten features, then ten feature values are computed for each score and are input into machine-learned model 142, which outputs a score for each set of ten feature values.

More specifically, block 220 may involve identifying attribute values from the job posting, such as a specific job title, a specific job seniority, a specific job function, and a specific job industry. For each skill, feature values corresponding to the attribute values are retrieved or computed based a combination of the attribute values and the skill. For example, block 220 may involve computing a percentage of job postings having the specific job title also having a particular skill. Such a percentage may be a pre-computed value that is retrieved from storage or is computed "on-the-fly" or in real-time. Such a percentage corresponds to one of multiple features of machine-learned model 142. Each feature of machine-learned model 142 is associated with a weight that was learned using one or more machine learning techniques.

Some job postings might not have certain attribute values specified, such as a job function or a job industry. For example, job postings that are generated offsite and that are presented onsite might not be complete in that sense. In such situations, such missing attributes may be assigned a default "undefined" value. The machine-learned model 142 may treat "undefined" as a specific feature value and handle it accordingly.

At block 230, the one or more skills are presented on a screen of a computing device of the job poster. Block 230 may involve sending text of the skills over network 120 to client 110. The data may be sent in an HTTP data packet and transmitted over the Internet using the Internet Protocol (IP). An application (whether a web application or a native application) presents/displays the text of the skills in a user interface on the screen. If multiple skills are identified and scored, then the skills may be ranked based on their respective scores and presented based on the ranking. For example, the highest ranked skill is listed first and the lowest ranked skill is listed last (or towards the bottom of the list or last in the list).

In an embodiment, the number of skills presented to the job poster is less than the number of skills identified in block 210. In this embodiment, machine-learned model 142 scores all (or most) of the skills identified in block 210 and selects the top N (e.g., ten) skills based on a ranking determined by the respective scores. Only the top N skills are presented.

At block 240, input is received that selects a subset of the presented skills. Block 240 may involve receiving the input through job posting interface 132. Selection of a skill may involve the job poster selecting the skill with a pointer control device (e.g., mouse) or with a finger on a touchscreen display. Alternatively, the input may involve the job poster selecting a button that indicates selection of multiple (e.g., all) the displayed skills. In this way, the job poster is not required to individually select each displayed skill.

FIG. 3 is a screenshot of an example job posting generation interface (JPGI) 300, in an embodiment. JPGI 300 is one portion of a larger interface not depicted. JPGI 300 includes a portion of a description section 310 and a skills section 320 that includes multiple skills, one or more of which are automatically determined and presented by server system 130. Such skills may be determined by analyzing text entered by the job poster in description section 310 and/or one or more other portions of JPGI 300 not depicted. Skills section 320 also allows a job poster to select a presented skill and remove the skill. Skills section 320 also allows a job poster to enter text for a skill that is not currently presented. In the depicted example, as the job poster enters text ("Deep"), one or more candidate skills (that are textual completions of the entered text) (including "Deep Learning") are presented to the job poster so that the job poster is not required to type the entire string.

At block 250, one or more selection records are generated, one for each skill that was presented and/or was selected. For example, if ten skills are presented and the job poster selects all ten, then ten selection records are generated. Block 250 may be performed by model generator 138 or another component of server system 130.

A selection record associates a particular skill with a job posting and includes a selection indicator that indicates whether the particular skill was selected. For example, a first selection record may be generated for a first skill that was presented and was selected, a second selection record may be generated for a second skill that was presented but not selected, and a third selection record may be generated for a third skill that was not presented but was selected (or specified by the job poster). Alternatively, a selection record may associate a single job posting with multiples skills, where each skill is associated with a selection indicator that indicates whether the skill was selected for the job posting.

At block 260, training instances are generated based on the selection records. Each training instance corresponds to a different skill. Each training instance includes a label indicating whether the corresponding skill was selected by a job poster. Each training instance includes feature values for the features of the machine-learned model 142, such as the features described previously. Block 260 may involve reading selection records from storage and reading the feature values from storage. Block 260 may further involve, for each selection record, identifying a job posting associated with the selection record, identifying attribute values of the job posting (e.g., job title, job function, job industry), and computing the feature values based on the attribute values and the skill corresponding to the selection record (e.g., a feature value based on P(skill|industry)). If a selection record includes data about multiple skills, then a training instance is generated for each of the skills.

Process 200 may proceed to block 210 where blocks 210-260 are repeated but with respect to a different job posting. Thus, blocks 210-260 may be repeated multiple times before process 200 proceeds to block 270.

At block 270, a second machine-learned model is trained based on training instances using one or more machine learning techniques. The training instances may be generated based on different job postings. Additionally, the training instances may include training instances that were generated using a different process, such as a manual process. Such training instances may have been used to train machine-learned model 142. Thus, the second machine-learned model may be trained using training instances that were used to train machine-learned model 142.

The second machine-learned model may be based on the same features as machine-learned model 142. The second machine-learned model may replace machine-learned model 142. Thus, process 200 may return to block 210 to process another job posting and the second machine-learned model is used in block 220 instead of machine-learned model 142.

In a related embodiment, the model that is used to initially generate the scores in block 220 is based on features that are different than the features upon which the second machine-learned model is trained in block 270. Furthermore, such an initial model might not be a machine-learned model, but a rule-based model where the rules or weights of the model are manually tuned/selected.

Using Skill Scoring Model for Job Recommendations

In an embodiment, a skill scoring model (e.g., machine-learned model 142 or a retrained version thereof) is used to generate an affinity score for a user-job posting pair. Candidate generator 140 may be the component in server system 130 that uses the skill scoring model to generate candidates or, more specifically in this situation, job recommendations for individual users.

An affinity score may indicate how likely the corresponding user is to select content that describes attributes of the corresponding job posting, view the job posting, or apply to the job posting. Alternatively, an affinity score indicates how closely related the corresponding user's job experience (and/or career plans) align with requirements of the corresponding job posting. Given multiple affinity scores pertaining to a particular user and different job postings, the job postings may be ranked by affinity score, where the ranking is used to select which job postings to present to the particular user. For example, for an affinity score below a first threshold, the corresponding job posting is discarded as a candidate for that particular user. For an affinity score above a second threshold, an email about the corresponding job posting is sent to the particular user. For an affinity score above a third threshold, a push notification or an in-app notification (describing the corresponding job posting) is sent to a computing device of the particular user.

In calculating an affinity score, the skill scoring model is used to compute a score for each skill in a job posting. The scored skills and the matching skills in a user's profile are input to another model or formula for calculating an affinity score for the user-job posting pair. The other model or formula may take into account the skills in the job posting that are not found in the user's profile and the scores computed for such skills. For example, the higher the scores of skills in a job posting that are not found in a user profile, all else being equal, the lower the affinity score for the user-job posting pair. Conversely, the fewer the skills that are associated with a job posting that are not found in a user's profile, all else being equal, the higher the affinity score for the user-job posting pair.

Additionally or alternatively, the other model or formula may involve comparing the skill overlap between the skills of a job posting and the skills listed in a user profile. The greater the overlap, the greater the similarity. One technique for computing similarity is Jaccard similarity. In an embodiment, a weighted technique is used that takes into account the weights of the skills in the job posting. For example, a weighted Jaccard similarity score is computed based on the scores of the job posting skills and the skills listed in a user profile.

In a related embodiment, a job posting is associated with skills that were not specified or selected by a job poster. Such skills may have been automatically determined for the job posting, but might not have been displayed to the job poster due to a (e.g., artificial) limit on the number of skills that should or can be displayed to the job poster. The skill scoring model scores such skills, which are used to compute a similarity between the skills of a job posting and skills listed in a user profile. Such a similarity is a factor in computing an affinity score between the job posting and the user profile.

Example Job Recommendation

Figure 4:
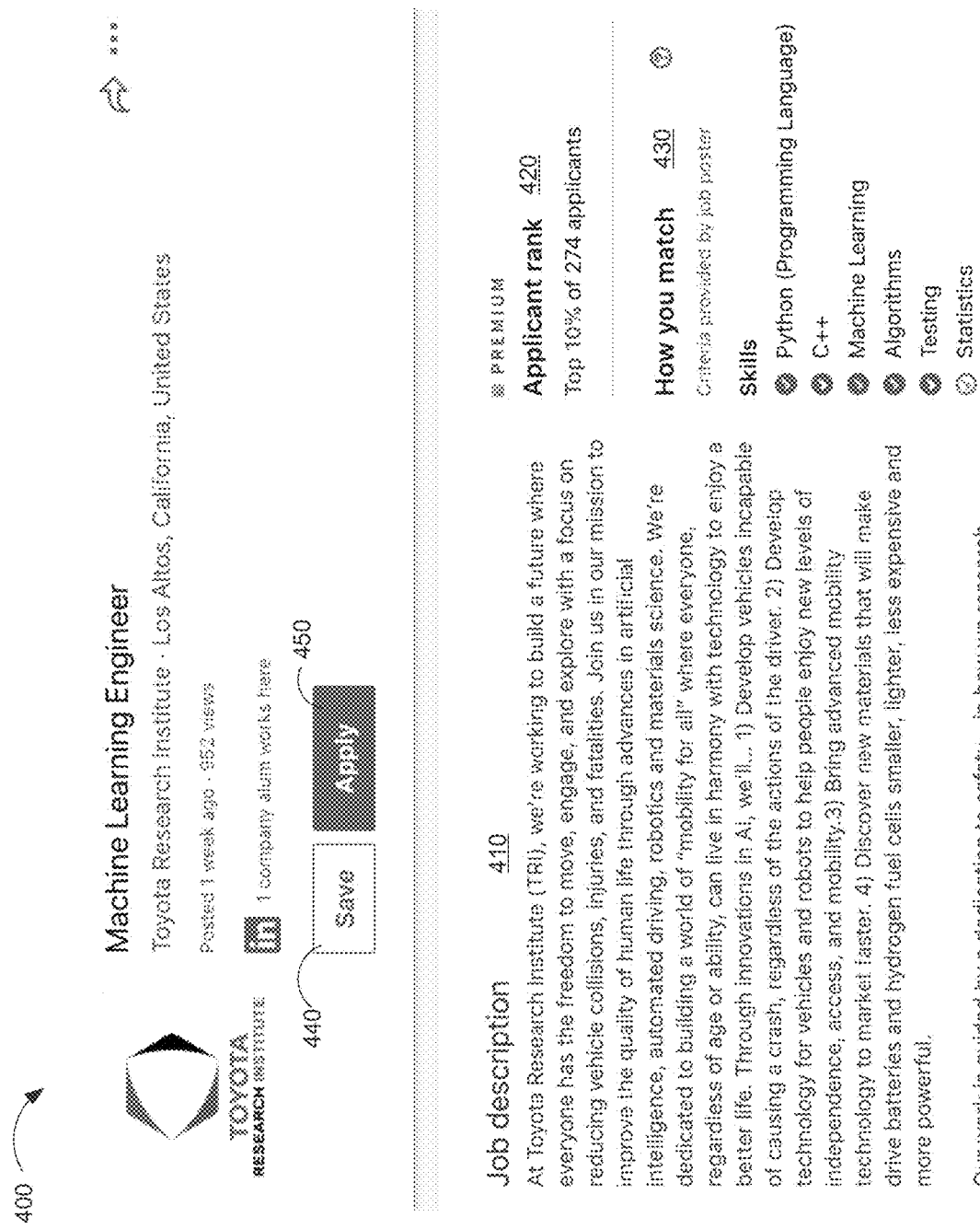
FIG. 4 is a screenshot of an example job posting, in an embodiment.

FIG. 4 is a screenshot of an example job posting 400, in an embodiment. Job posting 400 includes a job description 410, an applicant rank 420 that ranks the viewer relative to all those who have applied to the job posting, a skill match indicator 430 that lists the skills that the viewer has in common with the skills listed in the job posting and lists the skills that the view does not have but that are listed in the job posting, a save button 440, and an apply button 450. In this example, of six skills that are listed in skill match indicator 430, only one skill (i.e., Statistics) is not currently associated with the viewer's profile. Job posting 400 also includes information about when the job posting was posted, how many times the job posting was viewed, a number of former employees of the viewer's employer that works at the company with the job opening, a job title of the job position, and a location of the job position.

When selected, save button 440 causes the job posting to be saved in a virtual workspace of the viewer. The viewer may return to the virtual workspace (e.g., using a web browser or a native application) to view any saved job postings.

When selected, apply button 450 causes the viewer to officially apply to the job posting. "Applying" may involve sending a message to an account of a job poster (that created the job posting), a recruiter, or another user responsible for responding to applications to the job posting. The message may contain contact information about the viewer/applicant and/or information to contact the viewer/applicant to allow the recipient of the message to contact the viewer/applicant.

In an embodiment, skill scores are adjusted based on feedback from job posters. For example, if a job poster accepts a recommended skill or adds a new skill, then the score of that skill becomes of 1.0, even though machine-learned model 142 may have given the skill a different (lower) value. If a job poster rejects a skill, then the score of that skill becomes a zero. If there is no recorded poster action with respect to a skill, then the score of that skill is the score generated by machine-learned model 142. Such a skill may have been scored by machine-learned model 142 but not presented as a recommended skill due to a maximum number of skills already being displayed. As a specific example: machine-learned model 142 generates the following scores for skills S1-S6: 0.9, 0.8, 0.7, 0.6, 0.5, 0.4. Skills S1-S4 are presented to a job poster. The job poster selects skills S1-S3, rejects skill S4, and does not affirmatively accept or reject skills S5-S6 (since those skills were not presented to the job poster). Thus, the scores of skills S1-S6 for this job posting are as follows: 1.0, 1.0, 1.0, 0.0, 0.5, 0.4. In an embodiment, the number of recommended skills that are presented to a job poster is limited to ten. Thus, one or more skills that are scored lower than the tenth highest skill but higher than a particular threshold may be associated with a job posting even though the one or more skills were not presented to the job poster of the job posting.

Using Skill Scoring Model for User Recommendations

In an embodiment, a skill scoring model (e.g., machine-learned model 142 or a retrained version thereof) is used to generate an affinity score for a user-job posting pair. Candidate generator 140 may be the component in server system 130 that uses the skill scoring model to generate candidates or, more specifically in this situation, job candidate recommendations for individual job postings. Each candidate recommendation indicates that a candidate user might be a good candidate for a particular job posting. The candidate recommendations are presented to a user, such as a recruiter or human resources representative who may be looking to fill a particular job opening.

An affinity score may indicate how likely the corresponding user is to respond positively to an invitation from a recruiter to learn about the corresponding job posting, apply to the job posting, or be hired for the job. Alternatively, an affinity score indicates how closely the corresponding user's job experience (and/or career plans) aligns with requirements of the corresponding job posting. Given multiple affinity scores pertaining to a particular job posting and different candidate users, the candidate users may be ranked by affinity score, where the ranking is used to select which candidate users to present to a recruiter, for example. For example, for an affinity score below a first threshold, the corresponding candidate user is discarded as a candidate for the corresponding job posting. For an affinity score above a second threshold, an email about the corresponding candidate is sent to a recruiter. For an affinity score above a third threshold, a push notification or an in-app notification (about the corresponding candidate) is sent to a computing device of the recruiter.

Job Postings Created Offsite

In an embodiment, server system 130 hosts job postings that were created offsite (e.g., using a different computer system) and then presented to users/visitors of a website hosted by (or affiliated with) server system 130. Such job postings are referred to as offsite job postings. In this embodiment, machine-learned model 142 (or a retrained version thereof) scores skills that are listed in each offsite job posting. The scored skills are then used to generate one or more affinity scores, each between the offsite job posting and a different one of one or more user profiles.

In a related embodiment, server system 130 analyzes an offsite job posting and identifies one or more listed skills and one or more non-listed skills. A listed skill is one that derived unambiguously from the offsite job posting. As an example of a listed skill, an offsite job posting may include a section that lists skills that are required and/or requested for the job posting. As an example of a non-listed skill, an offsite job posting may include a description section that describes responsibilities and duties of the job and specifies one or more skills without calling them out (or naming them explicitly) as skills. Such a description is analyzed to extract one or more data items, each of which may comprise one or more words. Each extracted data item is compared against a standardized set of skills. If a (perfect or even imperfect) match exists, then the skill is considered a non-listed skill. For example, an extracted data item is first normalized before a match is performed. Example normalizations include removing plural 's', spell corrections, and removing 'ing' endings.

Another example of a non-listed skill is one that is commonly associated with one or more attribute values of an offsite job posting. For example, a particular skill is often associated with (in other job postings and/or in user profiles) a particular combination of a particular job title, a particular job function, a particular seniority level, and/or a particular set of one or more listed skills. Given that particular combination, the particular skill is associated with the offsite job posting, even though the job posting does not list the particular skill.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
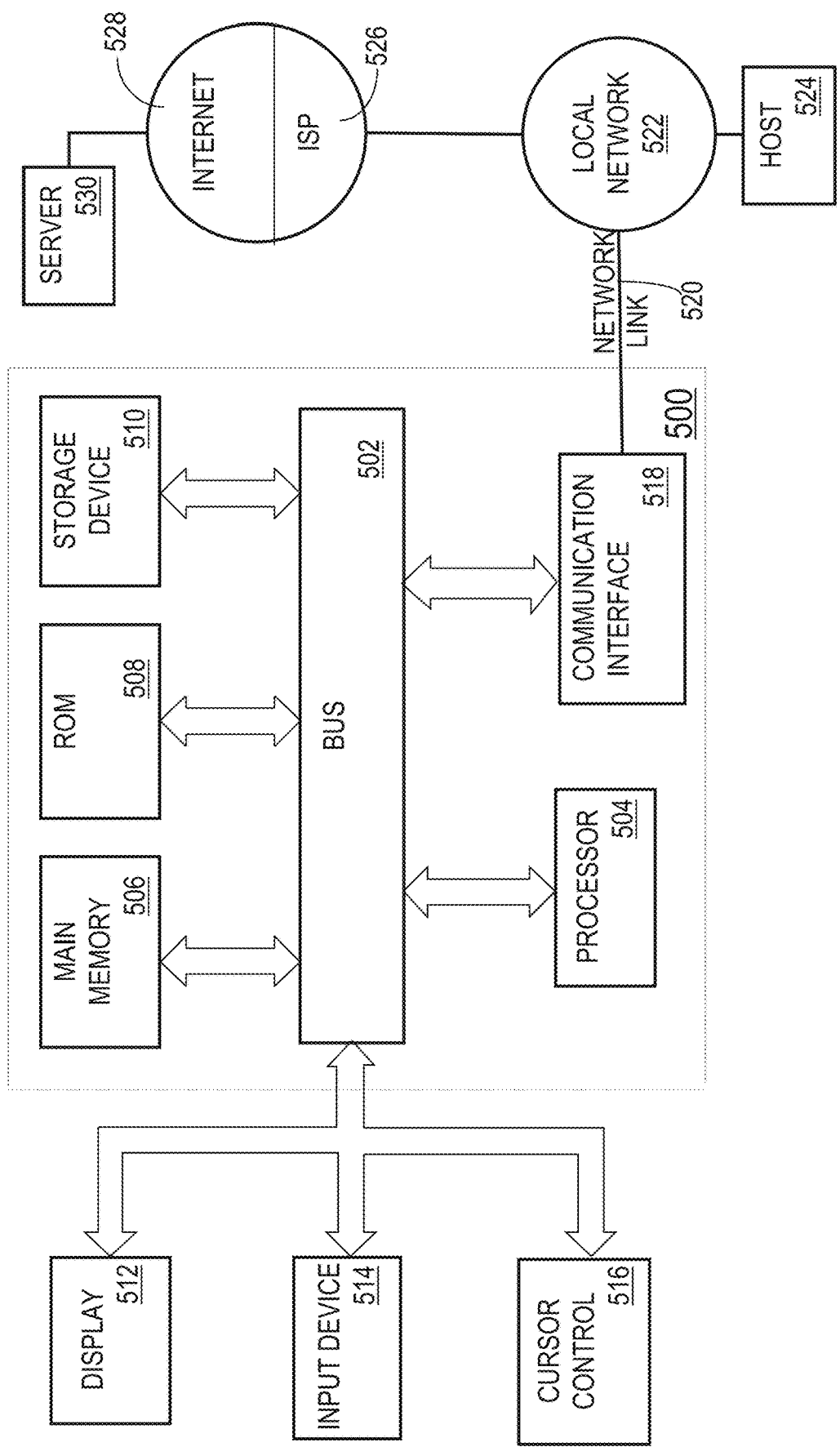
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, performed by one or more computing devices, the method comprising:

using a machine learning algorithm, training a machine learning model to receive, as input, a first plurality of skills referenced in a job posting and a plurality of attribute values of the job posting, and to generate, as output, a first plurality of scores for each skill of the first plurality of skills, wherein training of the machine learning model is based on at least one training instance that contains training data associated with a plurality of probabilities, each probability corresponding to a different attribute value for each skill of the first plurality of skills;

identifying a second plurality of skills of a candidate user;

inputting the second plurality of skills into the machine learning model to generate a second plurality of scores for each skill in the second plurality of skills based on the second plurality of skills of the candidate user and the plurality of attribute values;

generating an affinity score between the job posting and the candidate user based on the second plurality of scores and the second plurality of skills;

presenting, via a first user interface, to the candidate user the job posting based on the affinity score; and retraining the machine learning model based on the candidate user interacting with the job posting and feedback from a job poster, wherein the feedback from the job poster is obtained by:

presenting, via a second user interface, at least one corresponding skill of the first plurality of scores to the job poster and an applicant ranking based on at least one score;

receiving, from the job poster, feedback that indicates a selection or a rejection of at least one corresponding skill; and adjusting the machine learning algorithm of the machine learning model based on the feedback from the job poster.

2. The method of claim 1, further comprising:

receiving, from the job poster, input that comprises a plurality of data items for a second job posting;

using one or more machine learning techniques to retrain the machine learning model to receive, as input a third plurality of skills based on a second plurality of attribute values of the second job posting, and generate as output, a third plurality of scores for each skill in the third plurality of skills, wherein the training is based on one or more training instances and identifying a second plurality of probabilities, each probability corresponding to a different attribute value of the second plurality of attribute values for each skill in the third plurality of skills;

inputting the second plurality of probabilities into the machine learning model to generate the third plurality of scores for the third plurality of skills;

based on the third plurality of scores, selecting a subset of the third plurality of skills;

causing the subset of the third plurality of skills to be presented on a screen of a computing device of the job poster;

receiving, from the job poster, feedback that indicates the selection or the rejection of one or more skills in the subset of the third plurality of skills; and generating one or more training instances based on the feedback.

3. The method of claim 2, wherein:

the feedback also indicates a particular skill that is not included in the subset of the third plurality of skills; and the one or more training instances includes a training instance that indicates the particular skill and includes a label that indicates that the particular skill was selected.

4. The method of claim 2, wherein:

the feedback also indicates the rejection of a particular skill of the one or more skills that is included in the subset of the third plurality of skills; and the one or more training instances includes a training instance that indicates the particular skill and includes a label that indicates that the particular skill was rejected.

5. The method of claim 1, wherein the plurality of attribute values correspond, respectively, to a plurality of attributes that comprise one or more of job title, job function, or industry.

6. The method of claim 1, wherein the plurality of probabilities include:

a first probability that each skill is found in first job postings that include a first attribute value of the plurality of attribute values; and a second probability that each skill is found in second job postings that include a second attribute value of the plurality of attribute values.

7. The method of claim 1, wherein the plurality of probabilities include:

a first probability that each skill is found in first user profiles that include a first attribute value of the plurality of attribute values; and a second probability that each skill is found in second user profiles that include a second attribute value of the plurality of attribute values.

8. The method of claim 1, wherein the plurality of probabilities include:

a first probability that each skill was selected by the job poster that is associated with a first attribute value of the plurality of attribute values; and a second probability that each skill was selected by the job poster that are associated with a second attribute value of the plurality of attribute values.

9. The method of claim 1, wherein the plurality of probabilities include a first probability that each skill is found in job postings that include a first attribute value of the plurality of attribute values and a second attribute value of the plurality of attribute values.

10. A non-transitory storage medium storing a set of instructions that, when executed by one or more hardware processors, causes the one or more hardware processors to perform operations comprising:

using a machine learning algorithm, training a machine learning model to receive, as input a first plurality of skills based on a job posting and plurality of attribute values of the job posting, and to generate, as output, a first plurality of scores for each skill for the first plurality of skills, wherein training of the machine learning model is based on at least one training instance that contains training data associated with a plurality of probabilities, each probability corresponding to a different attribute value for each skill of the first plurality of skills;

identifying a second plurality of skills of a candidate user;

inputting the second plurality of skills into the machine learning model to generate a second plurality of scores for each skill in the second plurality of skills based on the second plurality of skills of the candidate user and the plurality of attribute values;

generating an affinity score between the job posting and the candidate user based on the second plurality of scores and the second plurality of skills;

presenting, via a first user interface, to the candidate user the job posting based on the affinity score; and retraining the machine learning model based on the candidate user interacting with the job posting and feedback from a job poster, wherein the feedback from the job poster is obtained by:

presenting, via a second user interface, at least one score and corresponding skill of the first plurality of scores to the job poster;

receiving, from the job poster, feedback that indicates selection or rejection of the corresponding skill; and adjusting the machine learning algorithm of the machine learning model based on the feedback from the job poster.

11. The non-transitory storage medium of claim 10, wherein the set of instructions further comprise:

receiving, from a job poster, input that comprises a plurality of data items for a second job posting;

retraining the machine learning model to receive, as input a third plurality of skills based on a second plurality of attribute values of the second job posting, and generate as output, a third plurality of scores for each skill in the third plurality of skills, wherein the training is based on one or more training instances and identifying a second plurality of probabilities, each probability corresponding to a different attribute value of the second plurality of attribute values for each skill in the third plurality of skills;

inputting the second plurality of probabilities into the machine learning model to generate the third plurality of scores of the third plurality of skills;

based on the third plurality of scores, selecting a subset of the third plurality of skills;

causing the subset of the third plurality of skills to be presented on a screen of a computing device of the job poster;

receiving, from the job poster, feedback that indicates selection or rejection of one or more skills in the subset of the third plurality of skills; and generating one or more training instances based on the feedback.

12. The non-transitory storage medium of claim 11, wherein:

the feedback also indicates a particular skill that is not included in the subset of the third plurality of skills; and the one or more training instances includes a training instance that indicates the particular skill and includes a label that indicates that the particular skill was selected.

13. The non-transitory storage medium of claim 11, wherein:

the feedback also indicates rejection of a particular skill that is included in the subset of the third plurality of skills; and the one or more training instances includes a training instance that indicates the particular skill and includes a label that indicates that the particular skill was rejected.

14. The non-transitory storage medium of claim 10, wherein the plurality of attribute values correspond, respectively, to a plurality of attributes that comprise one or more of job title, job function, or industry.

15. The non-transitory storage medium of claim 10, wherein the plurality of probabilities include:

a first probability that each skill is found in first job postings that include a first attribute value of the plurality of attribute values; and a second probability that each skill is found in second job postings that include a second attribute value of the plurality of attribute values.

16. The non-transitory storage medium of claim 10, wherein the plurality of probabilities include:

a first probability that each skill is found in first user profiles that include a first attribute value of the plurality of attribute values; and a second probability that each skill is found in second user profiles that include a second attribute value of the plurality of attribute values.

17. The non-transitory storage medium of claim 10, wherein the plurality of probabilities include:

a first probability that each skill was selected by the job poster that is associated with a first attribute value of the plurality of attribute values; and a second probability that each skill was selected by the job poster that are associated with a second attribute value of the plurality of attribute values.

18. The non-transitory storage medium of claim 10, wherein the plurality of probabilities include a first probability that each skill is found in job postings that include a first attribute value of the plurality of attribute values and a second attribute value of the plurality of attribute values.

* * * * *